United States Patent [19]
Kato

[11] Patent Number: 4,984,188
[45] Date of Patent: Jan. 8, 1991

[54] DIGITAL SIGNAL PROCESSING DEVICE FOR CALCULATING REAL AND IMAGINARY PARTS OF AN INPUT SIGNAL

[75] Inventor: Haruo Kato, Kuroiso, Japan

[73] Assignee: Kabushiki Kaisha Toshiba, Kawasaki, Japan

[21] Appl. No.: 363,395

[22] Filed: Jun. 6, 1989

Related U.S. Application Data

[63] Continuation of Ser. No. 130,645, Dec. 9, 1987, abandoned.

[30] Foreign Application Priority Data

Dec. 11, 1986 [JP] Japan ................................. 61-293433
Dec. 15, 1986 [JP] Japan ................................. 61-296566

[51] Int. Cl.$^5$ ........................ G06F 7/38; G06F 15/00
[52] U.S. Cl. ................................. 364/725; 364/413.25
[58] Field of Search ........................... 364/725, 713.25;
375/61, 77; 128/661.07–662.01

[56] References Cited

U.S. PATENT DOCUMENTS

3,914,999 10/1975 Grandchamp ................. 128/661.09
3,947,768 3/1976 Desblache et al. ................ 375/96
4,241,451 12/1980 Maixner et al. ................... 455/202

Primary Examiner—Dale M. Shaw
Attorney, Agent, or Firm—Oblon, Spivak, McClelland, Maier & Neustadt

[57] ABSTRACT

A digital input signal is input to a real part calculator and an imaginary part calculator. The real part calculator comprises an M-stage shift register formed of an M number of series-connected D-type latch circuits and for delaying the input signal in a stepwise manner where M represents 2 or more positive integers. The imaginary part calculator comprises an N number of series-connected D-type latch circuits for delaying the input signal in a stepwise manner, coefficient registers for storing coefficients corresponding to the respective latch circuits, multipliers for multiplying the output of the latch circuit and the corresponding coefficient thereof, and an adder for adding together all the outputs of the multipliers. Here, N denotes 2 or more positive integers. If N is an odd number, $M=(N+1)/2$, and, $M=N/2$ or $(N/2)+1$ if N is an even number. The coefficient registers store coefficients for enabling the digital filter to perform a Hilbert transformation. The real and imaginary part signals output from the real and imaginary part calculators are input to a phase calculator. The phase calculator comprises a divider for dividing the imaginary part signal by the real part signal, and a calculator for calculating an arctangent of the result of the division. Alternatively, the real and imaginary part signals may be supplied to an envelope calculator, which calculates the root-mean-square of the real and imaginary part signals.

6 Claims, 4 Drawing Sheets

DIGITAL SIGNAL PROCESSING DEVICE FOR CALCULATING REAL AND IMAGINARY PARTS OF AN INPUT SIGNAL

This application is a continuation of application Ser. No. 130,645, filed on Dec. 9, 1987, now abandoned.

BACKGROUND OF THE INVENTION

This invention relates to a digital signal processing device capable of calculating real and imaginary parts of an input signal and evaluating the phase and envelope of the input signal from the real and imaginary parts calculated.

In the case of an ultrasonic Doppler blood flowmeter, it is necessary that the phase of a Doppler signal be calculated so as to detect the speed and direction of flow of blood cells. The conventional phase detection method usually employs the Fourier transformation. According to the Fourier transformation method, however, data evaluation cannot begin until all the data to be used for Fourier transformation have been stored in memory. As a result, the corresponding storage time becomes a wait time and therefore increases the length of time required to perform such a transformation. In order for the ultrasonic Doppler blood flowmeter to detect and display the speed of bloodflow in real time, it is necessary for the number of data in a Doppler signal for Fourier transformation to be reduced, thereby reducing the accuracy of the readings obtained. Even if the data of a region not calculated in this way is to be evaluated by means of an interpolation method, any better accuracy is not obtained from this method and thus a time-consuming operation results. Furthermore, in typical ultrasonic diagnostic device it is necessary to detect the envelope of echo signal in order to obtain the tomographic image. The envelope of the echo signal represents the luminance of the image along a scanning line. Therefore, the tomographic image is obtained by scanning the object and by arranging the images with the detected luminance in a two-dimensional manner.

In the conventional method the envelope has been obtained by detecting the echo signal (analog signal) and passing the detected signal through a low-pass filter. However, since the waveform of the echo signal is degraded by its passage through the low-pass filter, the diagnostic data thus obtained is rendered useless due to a lowering of the spatial, densIty resolution of the ultrasonic image, as well as a lowering of the S/N ratio.

SUMMARY OF THE INVENTION

It is accordingly the object of this invention to provide a digital signal processing device of a simpler structure which can accurately calculate the real and imaginary parts of an input signal in real time and evaluate the phase and envelope of the input signal from the aforesaid real and imaginary parts.

According to this invention, there is provided a digital signal processing device comprising a digital filter for Hilbert-transforming a digital input signal, a delay circuit for delaying the digital input signal for a time period corresponding to that between the time a digital input signal is input to the digital filter and the time the Hilbert-transformed data of that input signal is output therefrom, and a signal processing circuit for processing the output of the digital filter as an imaginary part of the input signal and the output of the delay circuit as a real part of the input signal.

DETAILED DESCRIPTION OF THE PREFERRED EMBODIMENTS

Figure 1:
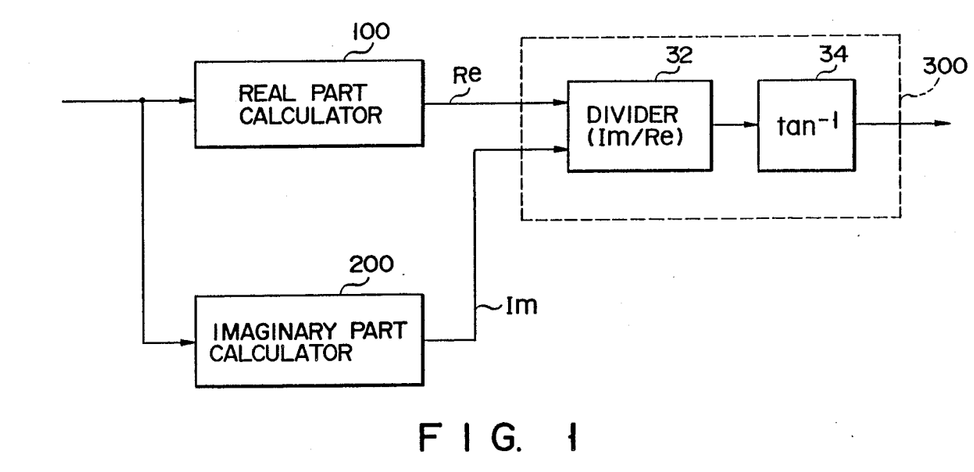
FIG. 1 is a block diagram showing a digital signal processing device according to a first embodiment of this invention.

FIG. 1 is a block diagram showing a digital signal processing device according to a first embodiment of this invention.

An input signal (digital signal), that is, a subject signal to be processed, is input to real part calculator 100 and to imaginary part calculator 200. A real part signal output from calculator 100 and an imaginary part signal output from calculator 200 are input to phase calculator 300 where a phase signal of the input signal is produced. Phase calculator 300 comprises divider 32 for dividing the imaginary part signal by the real part signal and calculator 34 for calculating an arctangent of the result of the division.

Figure 2:
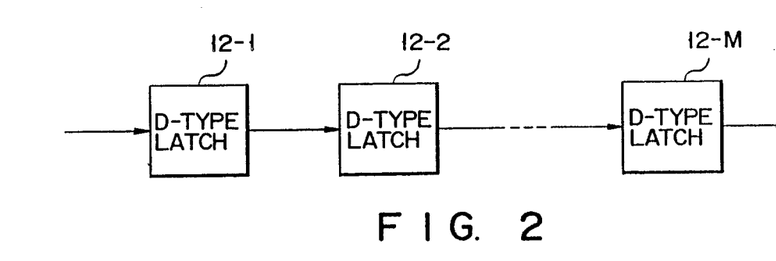
FIG. 2 is a detailed block diagram showing a real part calculator of the device in FIG 1.

Real part calculator 100 comprises an M number of D-type latch circuits 12-$i$ ($i=1$ to M) connected in a series fashion as shown in FIG. 2. Here, M represents a positive integer. That is, real part calculator 100 comprises an M-stage shift register and outputs the delayed input signal as a real part signal.

Figure 3:
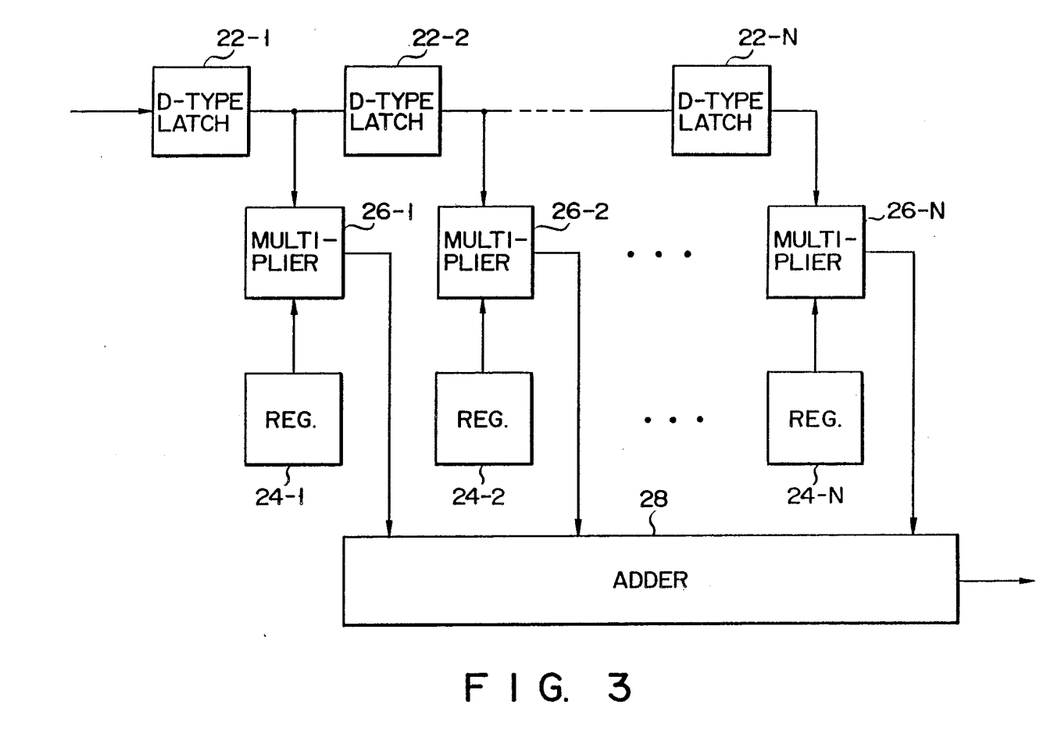
FIG. 3 is a detailed block diagram showing an imaginary part calculator of FIG. 1.

Imaginary part calculator 200 comprises a digital filter as shown in FIG. 3, that is, an N number of series-connected D-type latch circuits 22-$j$ ($j=1$ to N), serving as a shift register (an N-stage, not an M-stage), as in real part calculator 100, coefficient registers 24-$j$ for storing coefficients corresponding to latches 22-$j$, multipliers 26-$j$ for multiplying the outputs of latches 22-$j$ by the outputs of coefficient registers 24-$j$, and adder 28 for additively combining all the outputs of multipliers 26-$j$. Adder 28 outputs the digital-filtered signal as an imaginary part signal. Here, N denotes a positive integer not less than 3 if N is an odd number and not less than 2 if N is an even number. N is determined first, followed by M. That is, if N is an odd number, then $M=(N+1)/2$ and if N is an even number, $M=N/2$. Though not shown in FIG. 1, a common clock pulse is supplied to calculators 100 and 200, so that latches 12-$i$ of real part calculator 100 and latches 22-$j$ of imaginary part calculator 200 are operated interlocking with each other.

Coefficient register 24-$j$ stores a coefficient for allowing this digital filter to perform a Hilbert transformation. If M is an odd number, the coefficients represented by $-h((N-1)/2), \ldots, -h(2), -h(1), h(0), h(1), h(2), \ldots, h((N-1)/2)$ are respectively stored in coefficient registers 24-1, ..., 24-N, and while if N is an even number, the coefficients represented by $-h((N/2)), \ldots, -h(2), -h(1), -h(0), h(0), h(1),$
$h(2), \ldots, h((N/2)-11)$ are respectively stored therein.

Here, the coefficient h(0) represents the coefficient value of that coefficient register located at a middle position, this value being 0. That is, if N is an odd number, the coefficient value of coefficient register 24-((N+1)/2) is h(0) and, if N is an even number, the coefficient value of coefficient registers 24-((N/2)+1) or 24-(N/2) is h(0).

The transfer function of such a Hilbert transformation filter is given by:

$$H(\omega) = 2j \sum_{n=1}^{(N-1)/2} h(n) \sin n\omega \qquad (1)$$

if N is an odd number, and by $$H(\omega) = 2j \sum_{n=0}^{(N/2)-1} h(n) \sin(n + \tfrac{1}{2})\omega \qquad (2)$$

if N is an even number

Here, j denotes $\sqrt{-1}$.

The way in which equations (1) and (2) are derived will now be explained.

If N is an odd number, the transfer function is represented as follows:

$$H(z) = h(O) + \sum_{n=1}^{(N-1)/2} h(n) z^{-n} + \sum_{n=1}^{(N-1)/2} h(-n) z^n \qquad (3)$$

The frequency characteristic is obtained as follows if, in equation (3), h(0) is replaced by O and Z is replaced by $e^{-j\omega}$:

$$H(e^{-j\omega}) = \sum_{n=1}^{(N-1)/2} h(n) e^{jn\omega} + \sum_{n=1}^{(N-1)/2} h(-n) e^{-jn\omega} \qquad (4)$$

Equation (4) is rewritten as follows, based on the negative symmetry, i.e., $h(n) = -h(-n)$:

$$H(e^{-j\omega}) = \sum_{n=1}^{(N-1)/2} h(n) e^{jn\omega} - \sum_{n=1}^{(N-1)/2} h(n) e^{-jn\omega} \qquad (5)$$
$$= \sum_{n=1}^{(N-1)/2} h(n)(e^{jn\omega} - e^{-jn\omega})$$

Equation (5) is rewritten as follows, based on Euler's formula ($e^{j\omega} = \cos n\omega = j \sin n\omega$):

$$H(e^{-j\omega}) = \sum_{n=1}^{(N-1)/2} h(n)(\cos n\omega + j\sin n\omega - \cos n\omega + j\sin n\omega) \qquad (6)$$
$$= \sum_{n=1}^{(N-1)/2} h(n) 2j \sin n\omega$$
$$= 2j \sum_{n=1}^{(N-1)/2} \sin n\omega$$

If $H(e^{-j\omega})$ is expressed by $H(\omega)$, equation (1) is obtained.

If N is an even number, the transfer function is represented as follows:

$$H(z) = \sum_{n=0}^{(N/2)-1} h(n) z^{-(n+\tfrac{1}{2})} + \sum_{n=0}^{(N/2)-1} h(-1-n) z^{(n+\tfrac{1}{2})} \qquad (7)$$

The frequency characteristic is obtained as follows if z is replaced by $e^{-j\omega}$ and negative symmetry, i.e., $h(n) = -h(-1-n)$, is introduced:

$$H(e^{-j\omega}) = \sum_{n=0}^{(N/2)-1} h(n) e^{+j(n+\tfrac{1}{2})\omega} - \sum_{n=0}^{(N/2)-1} h(n) e^{-j(n+\tfrac{1}{2})\omega} \qquad (8)$$

Equation (8) is rewritten as follows, based on Euler's formula ($e^{j(n+(1/2))\omega} = \cos(n+(1/2))\omega + j \sin(n+(1/2))\omega$):

$$H(e^{-j\omega}) = \sum_{n=0}^{(N/2)-1} h(n)(e^{+j(n+\tfrac{1}{2})\omega} - e^{-j(n+\tfrac{1}{2})\omega}) \qquad (9)$$
$$= \sum_{n=0}^{(N/2)-1} h(n)(\cos(n+\tfrac{1}{2})\omega + j\sin(n+\tfrac{1}{2})\omega$$
$$\quad - \cos(n+\tfrac{1}{2})\omega - j\sin(n+\tfrac{1}{2})\omega)$$
$$= \sum_{n=0}^{(N/2)-1} h(n) 2j \sin(n+\tfrac{1}{2})\omega$$
$$= 2j \sum_{n=0}^{(N/2)-1} \sin(n+\tfrac{1}{2})\omega$$

If $H(e^{-j\omega})$ is expressed by $H(107)$, equation (2) is obtained.

As will be seen from Equations (1) and (2), since the Hilbert transformation filter can be regarded as a 90° phase shifter of nearly all-pass type, the imaginary part signal of an input signal is found by means of the Hilbert transformation if the input signal is a real part signal.

If an input signal is shifted to the latch circuit 22-j of the shift register corresponding to the coefficient register 24-j for storing the coefficient h(0), a corresponding Hilbert transformation signal is output from imaginary part calculator 200. That is, whether N is an odd number when the input digital signal is shifted to the latch circuit 22-((N+1)/2), or whether it is an even number when the input digital signal is shifted to the latch circuit 22-((N/2)+1) or 22-(N/2), in either case, the corresponding Hilbert transformated data is output. At this time, real part calculator 100 outputs an input signal which, if N is an odd number, is shifted by M=(N+1)/2 stages relative to the input digital signal, and if N is an even number, is shifted by M=(N/2)+1 or M=N/2 stages relative to the input digital signal. In this way, synchronization is achieved between the imaginary part signal output from imaginary part calculator 200 and the real part signal output from real part calculator 100. In order to obtain a correct output when the power is turned on, it is necessary to delay a signal output until all latches 22-1 to 22-N have input data scored therein, i.e., until N unit-times have elapsed.

Phase calculator 300 outputs a phase signal by calculating the arctangent of a division obtained by dividing the imaginary part by the real part.

If this embodiment is applied to an ultrasonic Doppler blood flowmeter in which digital signal of an ultrasonic Doppler signal is used as the input signal, it then becomes possible to detect the speed of bloodflow based on the output from phase calculator 300. Since, according to this embodiment, the Hilbert-transformed data is output each time the input data is shifted by one stage within the shift register, a long waiting time period is unnecessary, unlike in the case of the aforementioned Fourier transformation method, in which a calculation is performed after all requisite data has been stored in memory, to store the corresponding data into memory. Therefore, shorter time is necessary for outputting a result of transformation from the digital signal processing device of this invention. It is thus possible to more accurately detect and display the speed of bloodflow in real time without having to reduce the number of data contained in the Doppler signal. Furthermore, the digital signal processing device of this invention can be made simpler in form than the devIce utilizing the Fourier transformation method.

Examples of other input signals which can be used for phase detection are an echo signal of radar, a seismic wave signal, and a brain wave signal. Further, this phase detection device can be applied to a brain magnetic signal processing or a heart magnetic signal processing.

Although the Hilbert transformation filter has been explained as being a filter of nearly all-pass type, it can also be of a type which permits only a specific frequency band to pass therethrough by means of varyIng the Hilbert coefficient. If the Hilbert transformation filter is made by a high-pass type in view of the fact that, for example, the low frequency component contains more noises, then improved accuracy can be obtained on the device of this invention. In this case, it is necessary that real part calculator 100 also be made by a band-pass type digital filter. The band-pass type digital filter may be configured as shown in FIG. 3. It is the band-pass filter coefficient, not the Hilbert coefficient, that is stored in coefficient register of real part calculator 100.

In this case, the transfer function $B(\omega)$ of real part calculator 100 is as given below. If N is an odd number, $$B(\omega) = b(0) + 2 \sum_{n=1}^{(N-1)/2} b(n)\cos n\omega \quad (10)$$

and, if N is en even number, $$B(\omega) = 2 \sum_{n=0}^{(N/2)-1} b(n)\cos(n + \tfrac{1}{2})\omega \quad (11)$$

Here, b(n) is the band-pass filter coefficient and, as in the case of the Hilbert transformation filter, if N is an odd number, the coefficients represented by b((N−1)/2), ... , b(2), b(1), b(0), b(1), b(2), ... , b((N−1)/2)

are respectively stored in coefficient registers 24-l, ... , 24-n of real part calculator 100 while if N is an even number, the coefficients represented by b((N/2)−1), ... , b(2), b(1), b(0), b(1), b(2), ... , b((N/2)−1)

are respectively stored therein.

If N is an odd number, the transfer function is given as follows:

$$B(z) = \sum_{n=1}^{(N-1)/2} b(n) z^{-n} + b(0) + \sum_{n=1}^{(N-1)/2} b(-n) z^{n} \quad (12)$$

If z is replaced by $e^{-j\omega}$ and B(z) is replaced by $B(\omega)$, equation (12) is then rewritten as follows:

$$B(\omega) = b(0) + \sum_{n=1}^{(N-1)/2} b(n) e^{jn\omega} + \sum_{n=1}^{(N-1)/2} b(-n) e^{-jn\omega} \quad (13)$$

Based on a positive symmetry, i.e., b(n)=b(−n), equation (13) is rewritten as follows:

$$B(\omega) = b(0) + \sum_{n=1}^{(N-1)/2} b(n)(e^{jn\omega} + e^{-jn\omega}) \quad (14)$$

Equation (14) is rewritten as follows, based on Euler's formula:

$$\begin{aligned} B(\omega) &= b(0) + \sum_{n=1}^{(N-1)/2} b(n)(\cos n\omega + j\sin n\omega + \cos n\omega - j\sin n\omega) \\ &= b(0) + \sum_{n=1}^{(N-1)/2} b(n) 2\cos n\omega \\ &= b(0) + 2 \sum_{n=1}^{(N-1)/2} b(n)\cos n\omega \end{aligned} \quad (15)$$

As a result, equation (10) is obtained.

If N is an even number, the transfer function is represented as follows:

$$B(z) = \sum_{n=0}^{(N/2)-1} b(n) z^{-(n+\frac{1}{2})} + \sum_{n=0}^{(N/2)-1} b(-1-n) z^{(n+\frac{1}{2})} \quad (16)$$

If z is replaced by $e^{-j\omega}$ and $B(e^{-j\omega})$ is replaced by H(107) and the positive symmetry $(b(n)=b(-1-n))$ is introduced, equation (16) is then rewritten as follows:

$$B(z) = \sum_{n=0}^{(N/2)-1} b(n) e^{j(n+\frac{1}{2})\omega} + \sum_{n=0}^{(N/2)-1} b(n) e^{-j(n+\frac{1}{2})\omega} \quad (17)$$

Based on Euler's formula, $e^{j(n+(178))\omega}$ is replaced by $\cos(n+\tfrac{1}{2})\omega + j\sin(n+\tfrac{1}{2})\omega$, whereby equation (17) is written as follows:

$$\begin{aligned} B(\omega) &= \sum_{n=0}^{(N/2)-1} b(n)(e^{j(n+\frac{1}{2})\omega} + e^{-j(n+\frac{1}{2})\omega}) \\ &= \sum_{N=0}^{(N/2)-1} b(n)(\cos(n + \tfrac{1}{2})\omega + j\sin(n + \tfrac{1}{2})\omega \\ &\quad + \cos(n + \tfrac{1}{2})\omega - j\sin(n + \tfrac{1}{2})\omega) \\ &= \sum_{N=0}^{(N/2)-1} b(n) 2\cos(n + \tfrac{1}{2})\omega \\ &= 2 \sum_{N=0}^{(N/2)-1} b(n)\cos(n + \tfrac{1}{2})\omega \end{aligned} \quad (18)$$

As a result, equation (11) is obtained.

In this way, it is possible to detect the phase of a desired frequency band alone and to eliminate an adverse effect responsible for the presence of noises.

With the coefficient of the coefficient register at the middle of the band-pass fIlter of real part calculator 100, that is, with the coefficient of the coefficient register 24-((N+1)/2) if N is an odd number and that of the coefficient register 24-(N/2) or 24-((N/2)+1) if N is an even number represented by 1, respectively, and with the coefficients of the remaining coefficient registers represented by O, the bandpass filter can be represented simply as being equivalent to the circuit of FIG. 2.

Figure 4:
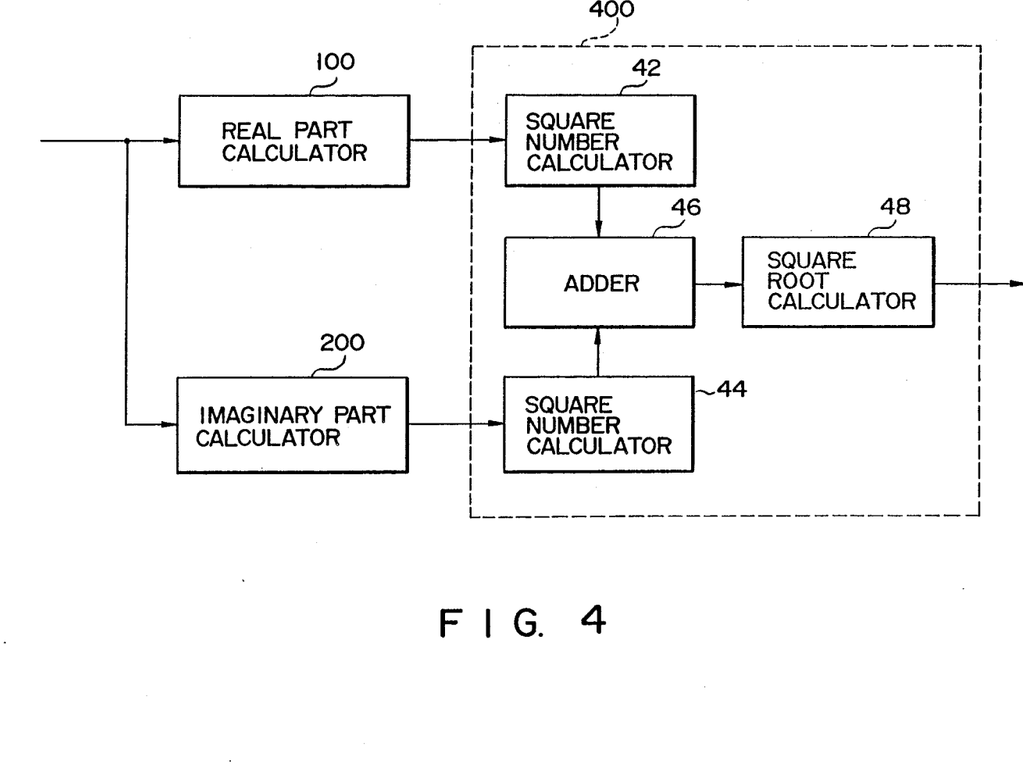
FIG. 4 is a block diagram showing a digital signal processing circuit according to a second embodiment of this invention.

FIG. 4 is a block diagram showing a digital signal processing device according to a second embodiment of this invention. Envelope calculator 400 is connected to real and imaginary part calculators 100 and 200 in place of phase calculator 300 of the first embodiment.

Envelope calculator 400 comprises square number calculator 42 for squaring the real part signal, square number calculator 44 for squaring the imaginary part signal, adder 46 for adding together the output of square calculator 42 and that of square number calculator 44, and square root calculator 48 for calculating the square root of the output of adder 46.

It is assumed that the second embodiment is applied to an ultrasonic diagnostic device, that the carrier frequency of both a transmitted ultrasonic wave and a reflected ultrasonic wave is $\omega$, and that the reflected ultrasonic wave is modulated by A(t). The received signal is expressed as follows:

$$s(t) = A(t)e^{j\omega t} \quad (19)$$

The way in which A(t) in derived will now be described.

First, using Euler's formula, the right side of equation (19) is expanded as follows:

$$s(t) = A(t)(\cos\omega t + j\sin\omega t) \quad (20)$$

The real part Sr(t) and the imaginary part Si(t) of S(t) are expressed as follows:

$$Sr(t) = A(t)\cos\omega t \quad (21)$$
$$Si(t) = A(t)\sin\omega t$$

The root-means-square of Sr(t) and Si(t) is calculated as follows:

$$\sqrt{(sr(t))^2 + (Si(t))^2} = \sqrt{(A(t)\cos\omega t)^2 + (A(t)\sin\omega t)^2} \quad (22)$$
$$= \sqrt{(A(t))^2\cos^2\omega t + (A(t))^2\sin^2\omega t}$$
$$= \sqrt{(A(t))^2(\cos^2\omega t + \sin^2\omega t)}$$
$$= \sqrt{(A(t))^2}$$
$$= |A(t)|$$

Therefore, the output of square root calculator 48 becomes the envelope of the digital input signal.

Where the second embodiment is applied to a typical ultrasonic diagnostic device, an envelope can be detected with high accuracy because that envelope is detected never through a low-pass filter. It is possible to obtain an ultrasonic image high in the spatial and concentration resolutions and in the S/N ratio.

Figure 5:
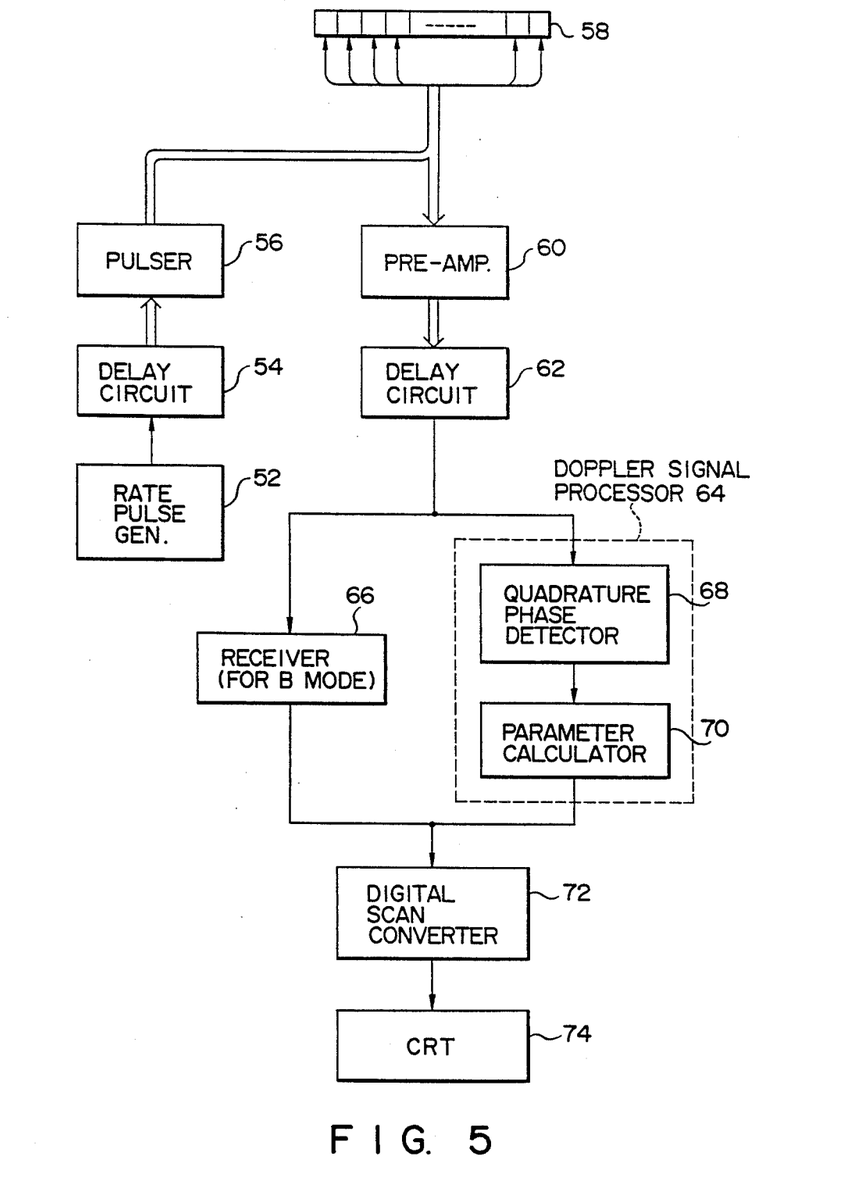
FIG. 5 shows an example of an ultrasonic diagnostic device according to this invention.

FIG. 5 shows an example of an ultrasonic diagnostic device employing the first and second embodiments. This device is a dynamic focusing receiver type.

Rate pulse generator 52, transmitting delay circuit 54, and pulser 56 form a transmitter circuit. Ultrasonic pulse radiated from ultrasonic transducer array 58 is electrically scanned by the transmitter circuit.

Received signal is supplied to receiving delay circuit 62 through pre-amplifier 60. Output signal from delay circuit 62 is supplied to B-mode receiver 66 and Doppler signal processor 64. Receiver 66 comprises an envelope detector which is formed of the second embodiment shown in FIG. 4. Doppler signal processor 64 comprises quadrature phase detector 68 which is formed of the first embodiment shown in FIG. 1 and parameter calculator 70 for calculating the speed, power, or variance of bloodflow.

Output signals from receiver 66 and Doppler signal processor 64 are supplied to digital scan converter 72. An image signal output from digital scan converter 72 is displayed at CRT display 74.

As is evident from the above, according to this invention, the imaginary part of an input signal is calculated by use of the Hilbert transformation filter, with the input signal being delayed for the period of time required for the Hilbert transformation to obtain the real part. Thus, the real and imaginary parts of the input signal can be calculated by means of a more simple arrangement, and the phase and envelope of that input signal readily calculated from the real and imaginary parts thus obtained.

This invention is not restricted to the aforementioned embodiments and can be changed or modified without departing from the scope thereof. The scope of this invention encompasses the calculation of real and imaginary parts from an input signal, and the application thereof is not restricted to the aforementioned usage. Furthermore, the aforementioned Hilbert transformation filter may be constructed in a software fashion, in place of a hardware fashion with the use of discrete circuit elements.

What is claimed is:

1. An ultrasonic diagnostic apparatus comprising:
   transducer means including an array of ultrasonic transducer elements;
   drive means for scanning said ultrasonic transducer elements so as to radiate an ultrasonic pulse to an object of diagnosis;
   receiver means for receiving the ultrasonic pulse radiated from said transducer means and reflected by the object of diagnosis and for outputting a digital received signal based on the pulse received;
   phase-detecting means for detecting a phase of the digital received signal from said receiver means, said phase-detecting means comprising
   imaginary part calculating means for Hilbert-transforming the digital received signal and outputting a Hilbert-transformed signal as an imaginary part signal wherein said imaginary part calculating means is a Hilbert-filter means having a frequency characteristic of a transfer function H(107 ) which is, $$H(\omega) = 2j \sum_{n=1}^{(N-1)/2} h(n)\sin n\omega$$

if N is an odd number, and $$H(\omega) = 2j \sum_{n=0}^{(N/2)-1} h(n)\sin(n = \tfrac{1}{2})\omega$$

if N is an even number, where
h(n) denotes a Hilbert-band-pass filter coefficient and, if N is an odd number, a coefficient corresponding to an output of an $(N-1)/2$-th latch circuit counted from an input end side is $h(0)$, and a coefficient corresponding to an output of an $((N-1)/2)+1$-th latch circuit counted from the input end side is $\pm(l)$ and, if N is an even number, a coefficient corresponding to an output of an $(N/2)\pm 1$-th latch circuit counted from the input end side is $\pm h(0)$, and a coefficient corresponding to an output of an $(N/2)\pm(1=l)$-th latch circuit counted from the input end side is $\pm h(\partial)$, and real part calculating means for delaying the digital received signal for a given time period which corresponds to a period of time from when the digital received signal is input to said imaginary part calculating means until the Hilbert-transformed signal is output from said imaginary part calculating means, and for outputting a delayed signal as a real part signal;

wherein a transfer function $B(\omega)$ of said real part calculating means is, $$B(\omega) = b(0) + 2 \sum_{n=1}^{(N-1)/2} b(n)\cos n\omega$$

if N is an odd number, and $$B(\omega) = 2 \sum_{N=0}^{(n/2)-1} b(n)\cos(n + (\tfrac{1}{2})\omega)$$

if N is an even number, where b(n) denotes a band-pass filter coefficient and, if N is an odd number, a coefficient corresponding to an output of an $(-1)/2$-th latch circuit counted from the input end side is $b(0)$, and a coefficient of an $((N-1)/2+1)$-th latch circuit counted from the input end side is $b(l)$, and if N is an odd number, a coefficient corresponding to an output of an $(N/2)+1$-th latch circuit counted from the input end side is $b(0)$, and a coefficient corresponding to an output of an $(N/2)+(1l)$-th latch circuit is $b(l)$; and phase calculating means for calculating an arctangent of a division which is obtained by dividing the imaginary part signal by the real part signal, and for outputting the arctangent as a phase of the digital received signal which indicates a speed and a direction of flow of the object; and display means for displaying the speed and the direction of the flow of the object on the basis of the phase detected by said phase-detecting means.

2. An ultrasonic diagnostic apparatus comprising:

transducer means including an array of ultrasonic transducer elements;

drive means for scanning said ultrasonic transducer elements so as to radiate an ultrasonic pulse to an object of diagnosis;

receiver means for receiving the ultrasonic pulse radiated from said transducer means and reflected by the object of diagnosis and for outputting a digital receiving signal based on the pulse received;

phase-detecting means for detecting a phase of the digital received signal from said receiver means, said phase-detecting means comprising digital filter means for outputting, as a real part signal, a predetermined frequency component of the digital received signal;

digital Hilbert-filter means for outputting, as an imaginary part signal, a predetermined frequency component of the digital received signal which is Hilbert-transformed wherein said Hilbert-filter means is a digital Hilbert-filter means having a frequency characteristics of a transfer function $(H\omega)$ of said digital Hilbert-filter means is, $$H(\omega) = 2j \sum_{n=1}^{(N-1)/2} h(n)\sin n\omega$$

if N is an odd number, and $$H(\omega) = 2j \sum_{n=0}^{(N/2)-1} h(n)\sin(n = \tfrac{1}{2})\omega$$

if N is an even number, where h(n) denotes a Hilbert-band-pass filter coefficient and, if N is an odd number, a coefficient corresponding to an output of an $(N-1)/2$-th latch circuit counted from an input end side is $h(0)$, and a coefficient corresponding to an output of an $(N-1)/2)\pm 1$-th latch circuit counted from the input end side is $\pm(l)$ and, if N is an even number, a coefficient corresponding to an output of an $(N/2)\pm 1$-th latch circuit counted from the input end side is $\pm h(0)$, and a coefficient corresponding to an output of an $(N/2)\pm(1=l)$-th latch circuit counted from the input end side is $\pm h(l)$, and wherein a transfer function $B(\omega)$ of said digital filter means is, $$B(\omega) = b(0) + 2 \sum_{n=1}^{(N-1)/2} b(n)\cos n\omega$$

if N is an odd number, and $$B(\omega) = 2 \sum_{N=0}^{(n/2)-1} b(n)\cos(n + (\tfrac{1}{2})l)\omega$$

if N is an even number, where b(n) denotes a band-pass filter coefficient and, if N is an odd number, a coefficient corresponding to an output of an $(N-1)/2$-th latch circuit counted from the input end side is $b(0)$, and a coefficient of an $((N-1)/2\pm 1)$-th latch circuit counted from the input end side is $b(l)$, and if N is an odd number, a coefficient corresponding to an output of an $(N/2)\pm 1$-th latch circuit counted from the input end side is $b(0)$, and a coefficient corresponding to an output of an $(N/2)\pm(1+l)$-th latch circuit is $b(l)$; and phase calculating means for calculating an arctangent of a division which is obtained by dividing the imaginary part signal by the real part signal, and for outputting the arctangent as a phase of the digital received signal which indicates a speed and a direction of flow of the object; and display means for displaying the speed and the direction of the flow of the object on the basis of the phase detected by said phase-detecting means.

3. An apparatus as in claim 2 wherein said digital Hilbert-filter means comprises:
a shift register formed of an N number (N:2 or more positive integer) of series-connected latch circuits;
a coefficient register for storing Hilbert-band-pass filter coefficients corresponding to respective outputs of the latch circuit; and
a calculator for multiplying the outputs of the latch circuits by corresponding coefficients and for adding together the results of all multiplications; and
said digital filter means comprises:
a shift register formed of an N number of series-connected latch circuit;
a coefficient register for storing band-pass coefficients corresponding to respective outputs of the latch circuit; and
a calculator for multiplying the outputs of the latch circuits by corresponding coefficients and for adding together the results of all multiplications.

4. An ultrasonic diagnostic apparatus comprising:
transducer means including an array of ultrasonic transducer elements;
drive means for scanning said ultrasonic transducer elements so as to radiate an ultrasonic pulse to an object of diagnosis;
receiver means for receiving the ultrasonic pulse radiated from said transducer means and reflected by the object of diagnosis and for outputting a digital received signal based on the pulse received;
envelope-detecting means for detecting an envelope of the digital received signal from said receiver means, said envelope-detecting means comprising
imaginary part calculating means for Hilbert-transforming the digital received signal and outputting a Hilbert-transformed signal as an imaginary part signal
real part calculating means for delaying the digital received signal for a given time period which corresponds to a period of time from when the digital received signal is input to said imaginary part calculating means until the Hilbert-transformed signal is output from said imaginary part calculating means, and for outputting a delayed signal as a real part signal wherein said Hilbert transform is by way of a digital Hilbert-filter means having a frequency characteristic of a transfer function H(l) of said digital Hilbert-filter means is, $$H(\omega) = 2j \sum_{n=1}^{(N-1)/2} h(n)\sin n\omega$$

if N is an odd number, and $$H(\omega) = 2j \sum_{n=0}^{(N/2)-1} h(n)\sin(n = \tfrac{1}{2})\omega$$

means h(n) denotes a Hilbert-band-pass filter coefficient and,
if N is an odd number,
a coefficient corresponding to an output of an (N−1)/2-th latch circuit counted from an input end side is h(0), and a coefficient corresponding to an output of an ((N−½)+1-th latch circuit counted from the input end side is +(l) and,
if N is an even number,
a coefficient corresponding to an output of an (N/2)+1-th latch circuit counted from the input end side is +h(0), and a coefficient corresponding to an output of an (N/2)+(1=∂)-th latch circuit counted from the input end side is +h(l), and wherein
a transfer function B(ω) of said real part calculating means is, $$B(\omega) = b(0) + 2 \sum_{n=1}^{(N-1)/2} b(n)\cos n\omega$$

if N is an odd number, and $$B(\omega) = 2 \sum_{N=0}^{(n/2)-1} b(n)\cos(n + \tfrac{1}{2})\omega$$

if N is an even number,
where b(n) denotes a band-pass filter coefficient and,
if N is an odd number,
a coefficient corresponding to an output of an (N−1)/2-th latch circuit counted from the input end side is b(0), and a coefficient of an ((N−1)/2=l)-th latch circuit counted from the input end side is b(l), and
if N is an odd number,
a coefficient corresponding to an output of an (N/2)+1-th latch circuit counted from the input end side is b(0), and a coefficient corresponding to an output of an (N/2)+(1+l)-th latch circuit is b(l); and
envelope calculating means for calculating a root-mean-square of the imaginary part signal and the real part signal, and for outputting the root-mean-square as an envelope of the digital received signal which indicates a luminance of the object; and
display means for displaying a tomographic image represented by the luminance of the object detected by said envelope-detecting means.

5. An ultrasonic diagnostic apparatus comprising:
transducer means including an array of ultrasonic transducer elements;
drive means for scanning said ultrasonic transducer elements so as to radiate an ultrasonic pulse to an object of diagnosis;
receiver means for receiving the ultrasonic pulse radiated from said transducer means and reflected by the object of diagnosis and for outputting a digital received signal based on the pulse received;
envelope-detecting means for detecting an envelope of the digital received signal from said receiver means, said envelope-detecting means comprising
digital filter means for outputting, as a real part signal, a predetermined frequency component of the digital received signal;
digital Hilbert-filter means for outputting, as an imaginary part signal, a predetermined frequency component of the digital received signal which is Hilbert-transformed wherein said Hilbert-filter means is a digital Hilbert-filter means having a frequency characteristics of a transfer function H(ω) of said digital Hilbert-filter means is, $$H(\omega) = 2j \sum_{n=1}^{(N-1)/2} h(n)\sin n\omega$$

if N is an odd number, and $$H(\omega) = 2j \sum_{n=0}^{(N/2)-1} h(n)\sin(n = \tfrac{1}{2})\omega$$

if N is an even number, where h(n) denotes a Hilbert-band-pass filter coefficient and, if N is an odd number, a coefficient corresponding to an output of an (N−1)/2-th latch circuit counted from an input end side is h(0), and a coefficient corresponding to an output of an (N−1)/2)+l-th latch circuit counted from the input end side is ±(∂) and, if N is an even number, a coefficient corresponding to an output of an (N/2)±1-th latch circuit counted from the input end side is ±h(0), and a coefficient corresponding to an output of an (N/2)±(1=l)-th latch circuit counted from the input end side is ±(l), and wherein a transfer function B(ω) of said digital filter means is, $$B(\omega) = b(0) + 2 \sum_{n=1}^{(N-1)/2} b(n)\cos n\omega$$

if N is an odd number, and $$B(\omega) = 2 \sum_{N=0}^{(n/2)-1} b(n)\cos(n + (\tfrac{1}{2})\omega)$$

if N is an even number, where b(n) denotes a band-pass filter coefficient and, if N is an odd number, a coefficient corresponding to an output of an (N−1)/2-th latch circuit counted from the input end side is b(0), and a coefficient of an (N−1)/2±l)-th latch circuit counted from the input end side is b(l), and if N is an odd number, a coefficient corresponding to an output of an (N/2)±1-th latch circuit counted from the input end side is b(0), and a coefficient corresponding to an output of an (N/2)±(1+l)-th latch circuit is b(l); and envelope calculating means for calculating a root-mean-square of the imaginary part signal and the real part signal, and for outputting the root-mean-square as an envelope of the digital received signal which indicates a luminance of the object; and display means for displaying a tomographic image represented by the luminance of the object detected by said envelope-detected means.

6. The apparatus according to claim 5, in which said digital Hilbert-filter means comprises:

a shift register formed of an N number (N≧2 positive integers) of series-connected latch circuits;

a coefficient register for storing Hilbert-band-pass filter coefficients corresponding to respective outputs of the latch circuit; and a calculator for multiplying the outputs of the latch circuits by corresponding coefficients and for adding together the results of all multiplications; and said digital filter means comprises:

a shift register formed of an N number of series-connected latch circuit;

a coefficient register for storing band-pass coefficients corresponding to respective outputs of the latch circuit; and a calculator for multiplying the outputs of the latch circuits by corresponding coefficients and for adding together the results of all multiplications.

* * * * *